US009829149B2

(12) United States Patent
Jennings

(10) Patent No.: US 9,829,149 B2
(45) Date of Patent: Nov. 28, 2017

(54) COMPENSATED MOTION BASE

(71) Applicant: Oceaneering International, Inc., Houston, TX (US)

(72) Inventor: Clifford Allen Jennings, Highland, MD (US)

(73) Assignee: OCEANEERING INTERNATIONAL, INC., Houston, TX (US)

( * ) Notice: Subject to any disclaimer, the term of this patent is extended or adjusted under 35 U.S.C. 154(b) by 0 days.

(21) Appl. No.: 14/735,592

(22) Filed: Jun. 10, 2015

(65) Prior Publication Data
US 2015/0354747 A1 Dec. 10, 2015

Related U.S. Application Data

(60) Provisional application No. 62/008,123, filed on Jun. 5, 2014.

(51) Int. Cl.
*B25J 9/12* (2006.01)
*F16M 11/20* (2006.01)
*F16M 11/12* (2006.01)
*F16M 11/18* (2006.01)
*B25J 9/14* (2006.01)

(52) U.S. Cl.
CPC ....... *F16M 11/2035* (2013.01); *F16M 11/121* (2013.01); *F16M 11/18* (2013.01); *F16M 11/2028* (2013.01); *B25J 9/12* (2013.01); *B25J 9/14* (2013.01); *Y10T 74/18888* (2015.01)

(58) Field of Classification Search
USPC ....... 248/637, 646, 651, 653, 654, 669, 678, 248/346.01, 346.05; 269/228, 43, 45, 156
See application file for complete search history.

*Primary Examiner* — Alfred Wujciak
(74) *Attorney, Agent, or Firm* — Maze IP Law, PC

(57) ABSTRACT

A compensated actuator, in various embodiments, comprises a base and an electric actuator and a fluid actuator interconnected to cooperatively allow for movement of an upper deck frame to which one or more compensated actuators are connected with or without using a pivoting connector. When so connected, a predetermined set of compensated actuators are connected to the upper deck frame and a platform intermediate the upper deck frame and the platform in a predetermined pattern and linear forces from the electric actuator and fluid actuator combined to impart rotation to an output attachment point.

3 Claims, 3 Drawing Sheets

COMPENSATED MOTION BASE

RELATION TO PRIOR APPLICATIONS

This application claims the benefit of, and priority through, U.S. Provisional Application 62/008,123, titled "Compensated Motion Base," filed Jun. 10, 2014.

FIELD OF THE INVENTION

The invention relates generally to positioning devices that move a payload via actuators.

BACKGROUND OF THE INVENTION

A compensated motion base is a vertical positioning device that moves its payload via actuators through multiple degrees of freedom (DOF) such as pitch, roll, heave, and/or yaw. Compensated motion bases may be used with small payload systems such as for scientific and/or medical uses; amusement or other ride vehicles; stationary simulators; large theaters; military and aircraft trainers; or the like, or combinations thereof.

FIGURES

The figures supplied herein disclose various embodiments of the claimed inventions.

DESCRIPTION OF VARIOUS EMBODIMENTS

As used herein, a set may comprise one or more elements, e.g. a set of compensated actuators 10 may be just one compensated actuator 10 or any number of compensated actuators 10. Each joint, as will be apparent to one of ordinary skill in the motion base arts, may be a spherical joint, a clevis joint, a ball joint, or the like. A pivoting connection is understood to include a hinged or other pivoting connection. Further, one of ordinary skill in the motion base arts would understand that a pneumatic actuator is used with a gas and a hydraulic actuator is used with hydraulic fluid. Accordingly, the term "fluid actuator," as used herein, covers either as the context requires, e.g. a fluid actuator used with gas as its fluid is a pneumatic actuator and a fluid actuator used with a liquid or similar hydraulic fluid as its fluid is a hydraulic actuator.

Figure 1:
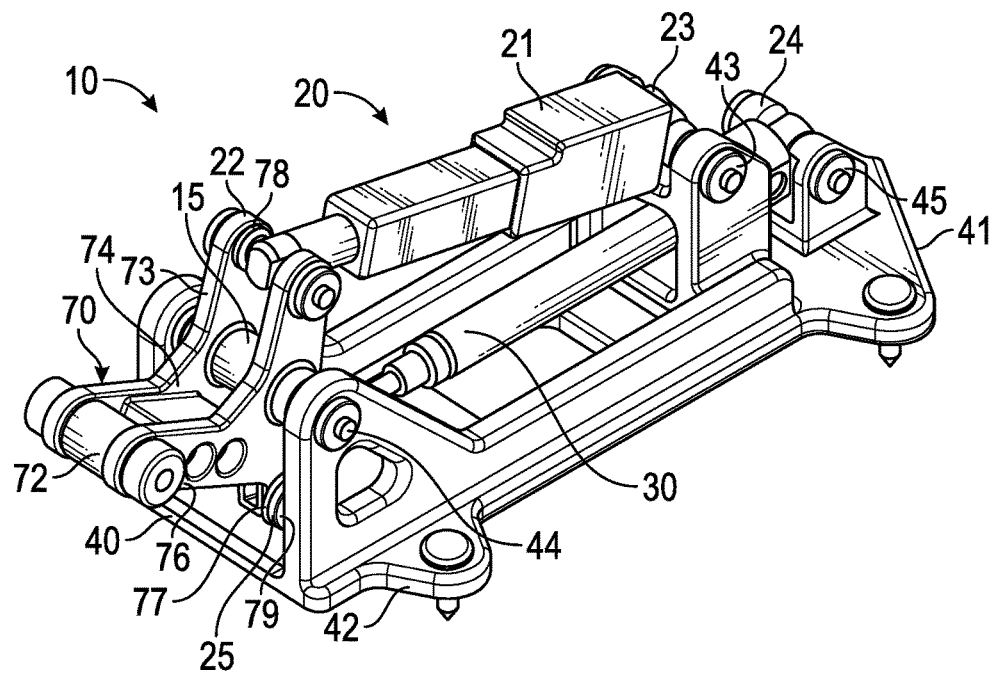
FIG. 1 is view in partial perspective of an exemplary embodiment of a compensated actuator.

Referring now to FIG. 1, in a first embodiment, compensated actuator 10 comprises pivoting connector 70, base 40, electric actuator 20, and fluid actuator 30.

Pivoting connector 70 comprises output attachment point 72 configured to be pivotally attached to a payload-bearing main deck 80 (FIG. 2), first joint 78, and second joint 79. In an embodiment, pivoting connector 70 is used to combine linear forces and impart rotation to output attachment point 72. As will be apparent to those of ordinary skill in the motion base arts, pivoting connector 70 pivots and/or is hinged with respect to base 40.

Figure 3:
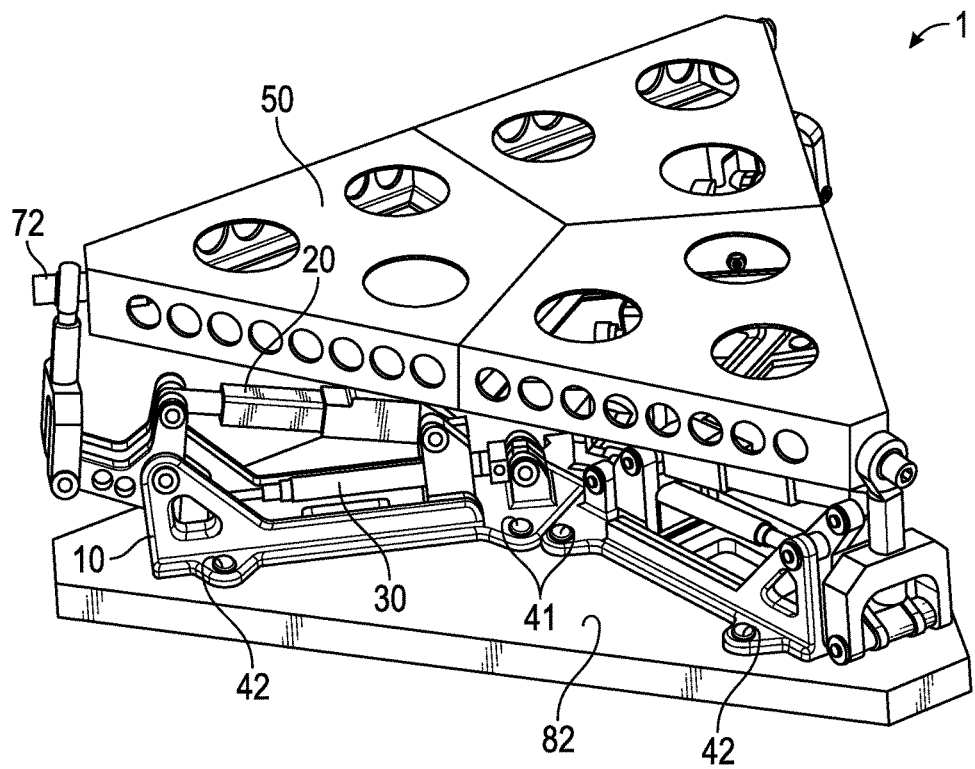
FIG. 3 is view in partial perspective of an exemplary embodiment of a compensated motion base.

Base 40 typically comprises two or more attachment points by which base 40 can be connected to a further structure, e.g. platform 82 (FIG. 3). By way of example and not limitation, base 40 may comprise one or more first attachment points 41 configured to be connectable to a first predetermined location, by way of example and not limitation such as proximate a center point of platform 82, and one or more second attachment points 42 configured to be connectable to a second predetermined location, such as by way of example and not limitation proximate an outer perimeter of platform 82. Base 10 further comprises one or more linear actuator joints 43, one or more fluid actuator joints 45, and one or more connector joints 44 configured to accept pivoting connector 70 such as at pivot 15 and allow pivoting connector 70 to be pivoted or hinged with respect to base 40.

Electric actuator 20 is cooperatively and pivotally connected to pivoting connector 70 at first joint 22 and first connector joint 78 and pivotally connected to base 40 at linear actuator joint 43 via first base joint 23. This arrangement combines the refractive force of electric actuator 20 with the extensive force of fluid actuator 30, resulting in the powered raising of pivoting connector 70 with respect to output joint 72. It also combines the extensive force of electric actuator 20 with the retractive force of fluid actuator 30, resulting in the powered lowering of output attachment point 72. However, electrical actuator 20 may be operatively linked to fluid actuator 30 and output attachment point 72 a variety of ways, depending on the desired orientation of actuators 20,30 and the direction of force to be delivered by output attachment point 72. Further, electric actuator 20 and fluid actuator 30 may be positioned on the same side of axis 44, so that the extensive and retractive forces of both actuators are acting in the same direction.

In typical embodiments, electrical actuator 20 is a separate component with respect to fluid actuator 30 and may comprise a linear electrical actuator or a rotary electrical actuator or the like. In other embodiments, electrical actuator 20 may be positioned within inflatable fluid actuator 30. In certain embodiments, electrical actuator 20 and fluid actuator 30 are an integrated device, such as where both are coaxial and share a coupled or common shaft.

Fluid actuator 30 is cooperatively connected to electric actuator 20 by being pivotally connected to connector 70 at second joint 25 and second connector joint 79 and pivotally connected to base 10 at fluid actuator joint 45 via second base joint 24. Fluid actuator 30 may comprise a passively pressurized fluid actuator, an inflatable fluid actuator such as an air bag or air stroke actuator, or the like.

Compensated actuator 10 may further comprise fluid supply tank 60 (FIG. 2) operatively in fluid communication with fluid actuator 30 and configured to provide a predetermined spring rate for fluid actuator 30, e.g. a substantially constant spring rate.

Figure 2:
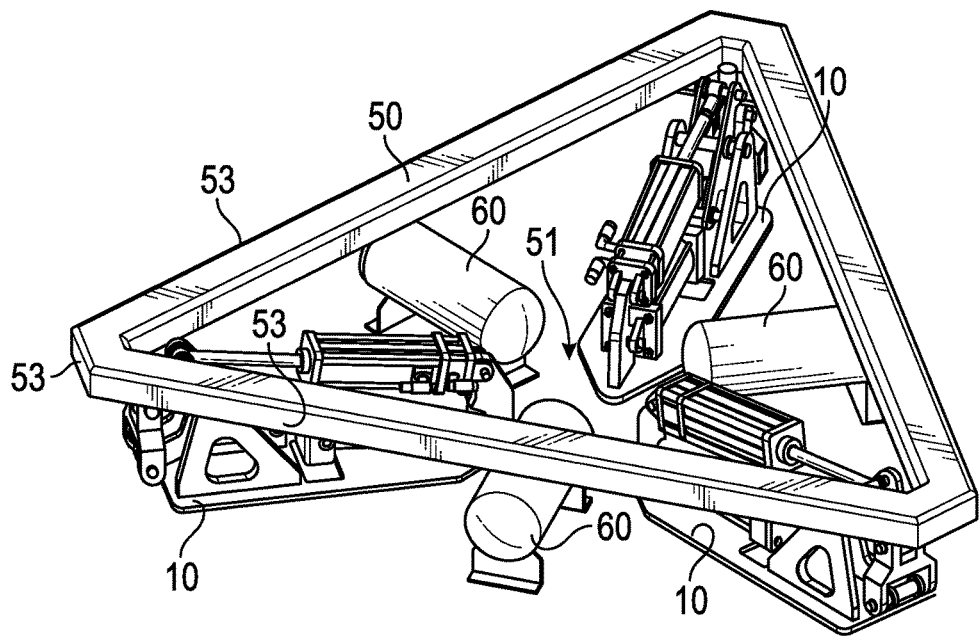
FIG. 2 is view in partial perspective of an exemplary embodiment of a compensated motion base illustrating a compensated actuator and upper deck frame.

Referring now to FIGS. 2 and 3, in a further embodiment, compensated motion base 1 comprises upper deck frame 50, comprising predetermined outer perimeter 53, platform 82, and a set of compensated actuators 10 disposed intermediate upper deck frame 50 and platform 82 and arranged in a predetermined pattern. Each compensated actuator 10 of the set of compensated actuators 10 is as described above, and at least one actuator 10 of the set of compensated actuators 10 is operatively connected to upper deck frame 50 via one or more corresponding pivoting connectors 70.

Referring additionally back to FIG. 1, for this embodiment, connector 70 may further comprise pivot junction 74, first extension 76 extending away from pivot junction 74 where first extension 76 comprises output attachment point 72 and is configured to be pivotally or hingedly connected to upper deck frame 50, and second extension 73 extending away from pivot junction 74 at a predetermined offset from first extension 76. Second extension 72 typically comprises first connector joint 78 and is configured to be connected to an associated linear actuator 20 of the group of actuators at first joint 22 and first connector joint 78. Pivoting connector 70 further comprises hinge 77 defined at a meeting junction of first extension 76 and second extension 72 where hinge 77 comprises second connector joint 79.

Figure 4:
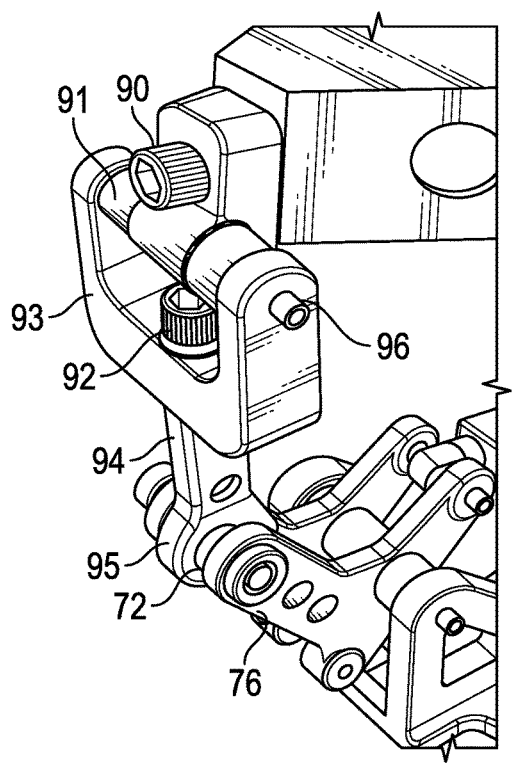
FIG. 4 is view in partial perspective of a further exemplary embodiment of a compensated actuator in a first position.
Figure 5:
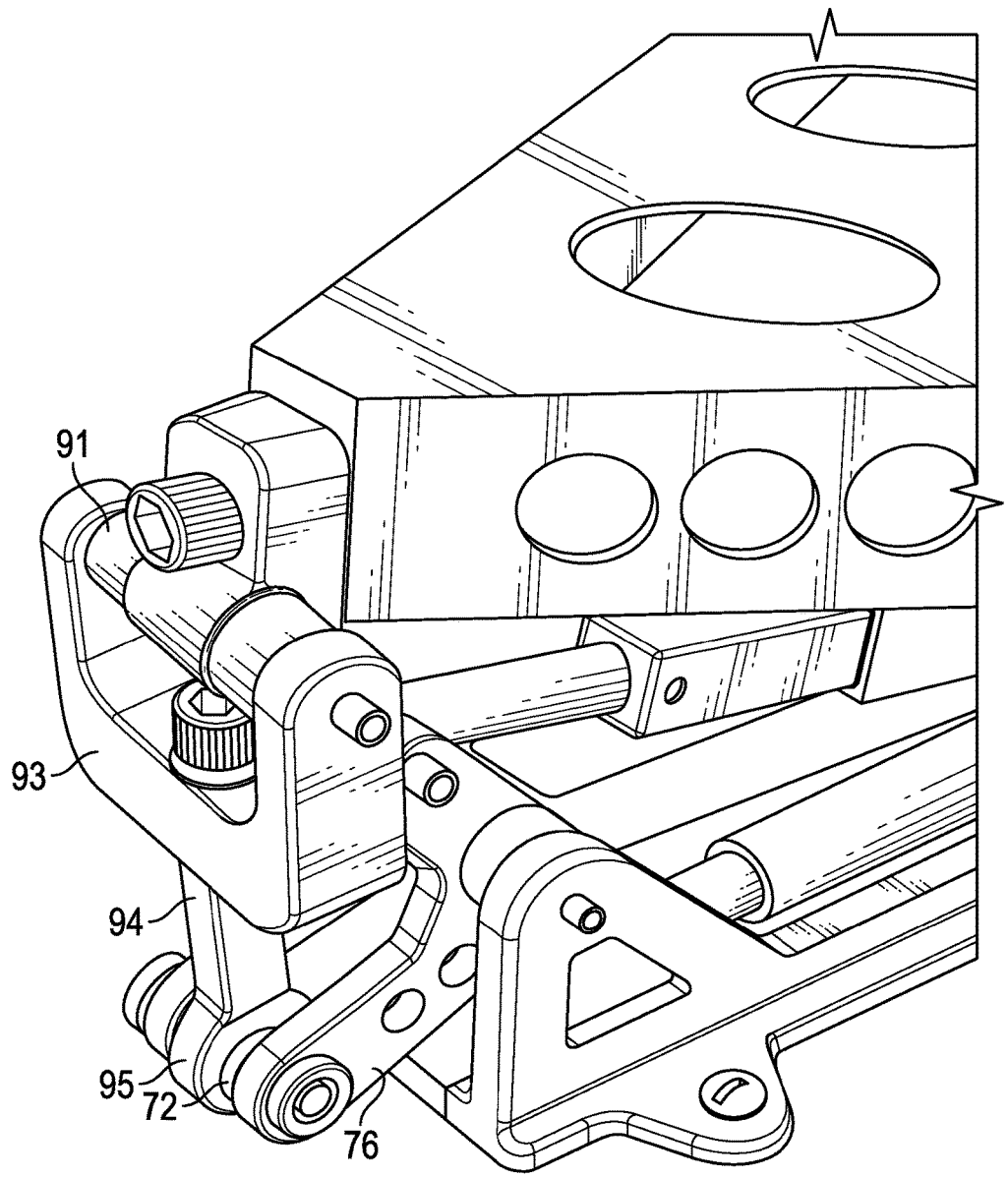
FIG. 5 is view in partial perspective of a further exemplary embodiment of a compensated actuator in a second position.

Referring additionally to FIGS. 4 and 5, in additional embodiments pivoting connector 70 may further comprise one or more support brackets 93, at least one of which comprises pivot junction 96; one or more support arms 94 connected to at least one support bracket 93, at least one support arm 94 being further pivotally connected to first extension 76 at support arm pivot connector 95, and pivot 91 pivotally connected to at least one of the support brackets 93 at pivot junction 96 where pivot 91 is configured to be connected to upper deck frame 50 at support connector 90.

First attachment point 41 (FIG. 1) is configured to be connectable to a predetermined location proximate the center point of platform 82 and second attachment point 42 is configured to be connectable to a predetermined location proximate an outer perimeter of platform 72.

In various embodiments, a set of fluid supply tanks 60 may be present but are not required. If present, one or more fluid supply tanks 60 are operatively in fluid communication with one or more corresponding fluid actuators 30 and configured to provide a predetermined spring rate for its corresponding fluid actuator 30. In embodiments, the predetermined spring rate comprises a substantially constant spring rate.

Upper deck frame 50 and platform 82 may comprise any shape. By way of example and not limitation, if several degrees of freedom are desired, upper deck frame 50 may comprise a triangular outer perimeter and the set of compensated actuators 10 may comprise three or more compensated actuators 10. Typically, each compensated actuator 10 is arranged evenly and radially outward from proximate a center point of platform 82 or upper deck 50 to a predetermined triangular junction point on outer perimeter 53. One or more output attachment points 72 may be configured to be pivotally attached to upper deck frame 50 and/or payload-bearing deck 80, operatively connected to upper deck frame 50, proximate a triangular junction point on outer perimeter 53. In such configurations, the corresponding set of fluid supply tanks 60 may comprise three fluid supply tanks 60, each fluid supply tank in fluid communication with a corresponding compensated actuator 10.

Typically, compensated motion base 1 is configured to provide multiple degrees of freedom. By way of example and not limitation, compensated motion base 1 may implement a pitch or roll platform, e.g. one that pivots, and at least one compensated actuator 10 of the set of compensated actuators 10 is operatively connected to the pitch or roll platform. However, other configurations are also contemplated. By way of further example and not limitation, upper deck frame 50 and/or payload-bearing deck 80 may comprise a circular, substantially rectangular, or obround outer perimeter 53. Further, the set of compensated actuators 10 may comprise just one actuator configured to provide a sole degree of freedom of movement. In other embodiments, two compensated actuators 10 may be deployed at points proximate a single side of substantially rectangular or obround outer perimeter, where an opposing side is hinged or otherwise secured to platform 82 and several degrees of freedom of movement may be achieved. In yet other configurations, upper deck frame 50 may comprise a substantially round outer perimeter and the set of compensated actuators 10 may comprise multiple compensated actuators 10 by which several degrees of freedom of movement may be achieved.

In a further embodiment, connector 70 is not used. Instead, compensated motion base 1 may comprise upper deck frame 50, comprising a predetermined outer perimeter 53, platform 82, and a set of compensated actuators 10 arranged in a predetermined pattern, by way of example and not limitation evenly and radially outward from proximate a center point 51 of upper deck frame 50 or platform 82 to outer perimeter 53. Although similar to the above described configurations, in this embodiment one or more electric actuators 20 is pivotally connected to base 40 at base coupler 43 via first base joint 43 and pivotally connected to upper deck frame 50 at a first joint 22, The corresponding fluid actuator 30 is pivotally connected to base 40 at second base joint 45 and to upper deck frame 50 at or proximate to first joint 22, e.g. with second joint 25, so as to be cooperatively connected to electric actuator 20. In this embodiment, first joint 22 and second joint 25 may be substantially co-located.

In embodiments where both actuators 20,30 are vertical, and therefore pushing between a common base and upper attachment, an alternative structure, e.g. a scissor lift or the like, may be used to provide horizontal guidance and prevent a load such as platform 50 or the entire compensated motion base 1 from falling over. Thus, a scissor lift or similar mechanism, e.g. vertical rails, rollers, or the like, or a combination thereof, may be used at one or more actuator groups 10.

As with the other embodiments, a set of fluid supply tanks 60 may be present with each fluid supply tank 60 of the set of fluid supply tanks 60 being operatively in fluid communication with a corresponding fluid actuator 30 and configured to provide a substantially constant spring rate for each connected fluid actuator 30.

In the operation of exemplary embodiments, typically electrical actuator 20, whether linear or rotary, is coupled between platform 82 and a movable load, e.g. on disposed on upper deck frame 50 and/or payload-bearing deck 80. The movable load is compensated, e.g. partially, for by an additional force in the form of fluid gas or hydraulic pressure.

Accordingly, compensated motion base 1 may be provided by coupling a predetermined set of compensated actuators 10 to upper deck frame 50 and platform 82 as described above. If present, pivoting connectors 70 may be used to combine the linear forces from electric actuator 20 and fluid actuator 30 and, as a result, impart rotation to output attachment point 72.

As described above, the set of compensated actuators 10 is arranged in a predetermined pattern such as evenly and radially outward from proximate a center point 51 of upper deck frame 50 and/or platform 82 to outer perimeter 53.

Compensation for forces exerted by a movable load present on upper deck frame 50 may be accomplished by providing an additional force in the form of fluid pressure, such as gas or hydraulic, to one or more fluid actuators 30 as a compensating pressure which may comprise a pressure sufficient to partially compensate for the movable load. Depending on a predetermined triggering condition, the compensating pressure may be set for a known static mass of moving machinery/equipment, a known unchanging mass of a consistent payload, a changing mass of an inconsistent payload, and/or an amount at, slightly below, or slightly above, any of these, or the like, or a combination thereof. The predetermined triggering condition may include a desired operation outcome or a failure mode.

If the movable load comprises a changing payload, a mass calibrator such as a scale or other weighing device, or the like, or a combination thereof may be incorporated and used to determine the required compensation pressure. Payload compensation may then be changed based on the determined compensation pressure.

Once the compensating pressure is set, an electrical actuator 20 corresponding to a pneumatic actuator 30 is allowed to perform a predetermined set of functions. By way of example and not limitation, one or more of the set of pneumatic actuators 30 may be used to carry the desired portion of both a static and a changing payload, permitting their corresponding electrical actuators 20 of the set of electrical actuators 20 to perform the desired motion functions with decreased power consumption than if acting alone.

It may be advantageous to statically pressurize one or more of the set of fluid actuators 30 so that it acts as a spring. The pneumatic pressure can be adjusted, e.g. initially or at some other point in time, such that a fluid actuator 30 changes its effective spring rate. At other times, it may be advantageous to set a pneumatic pressure for one or more fluid actuators 30 just below the fixed mass of upper deck frame 50 and/or payload-bearing deck 80 such as when there is moving equipment as opposed to changing payload. This fixed mass may include the mass of upper deck frame 50 and/or payload-bearing deck 80 as well as its associated linkages, containers, benches, enclosures, electronics, and the like, or a combination thereof. In this scenario, an electric actuator 20 cooperatively coupled to a fluid actuator 30 may be adjusted or otherwise allowed to lift the remaining portion of fixed mass plus the entire load of payload beyond that and overcome the total inertia. Upon power removal, compensated motion base 1 may be allowed to settle to a minimal stroke, with or without payload.

At further times, it may be advantageous to set pneumatic pressures of one or more fluid actuators 30 just above the fixed mass of the moving equipment, so that the compensated motion base 1 can settle out at mid-stroke with no payload.

At other times, it may be advantageous to set pneumatic pressures of one or more fluid actuators 30 just below the mass of moving equipment and payload. In these configurations, a characteristic of the payload may be monitored and, if the payload remains constant between operations, the pneumatic pressure of one or more fluid actuators 30 fixed at the calculated pressure]. However, if payloads vary, the pneumatic pressure of one or more fluid actuators 30 may be adjusted accordingly. Upon power removal, compensated motion base 1 can be allowed to settle to a minimal stroke, with or without payload.

In yet a further configuration, pneumatic pressures of one or more fluid actuators 30 is set just above the total mass of the moving equipment and payload so that the compensated motion base 1 can settle out at mid-stroke or above the total mass of the moving equipment and payload so that compensated motion base 1 can settle out at maximum stroke.

Applications of compensated motion base 1 may including small payload systems such as for scientific and/or medical uses; amusement or other ride vehicles; stationary simulators; large theaters; military and aircraft trainers; or the like, or combinations thereof. Accordingly, controller 100 may be present and operatively in communication with one or more electrical actuators 10, fluid actuators 30, pressure tanks 60, and the various sensors described herein and control each according to the needs presented by the application.

The foregoing disclosure and description of the invention is illustrative and explanatory. Various changes in the size, shape, and materials, as well as in the details of the illustrative construction and/or an illustrative method may be made without departing from the spirit of the invention.

What is claimed is:
1. A compensated actuator, comprising:
   a. a base, comprising an upper surface, a lower surface, and a longitudinal axis, the base further comprising:
      i. a first attachment point disposed along the longitudinal axis at which the base may be attached to a payload bearing platform at a first platform location;
      ii. a second attachment point disposed at a distance along the longitudinal axis away from the first attachment point at which the base may be attached to the payload bearing platform at a predetermined second platform location proximate an outer perimeter of the payload bearing platform;
      iii. a linear actuator joint disposed at a predetermined position about the upper surface along the longitudinal axis intermediate the first attachment point and the second attachment point;
      iv. a fluid actuator joint disposed about the upper surface at a predetermined position proximate the linear actuation joint; and
      v. a base connector joint disposed about the upper surface opposite the linear actuator joint along the longitudinal axis;
   b. an electric actuator, comprising:
      i. a first connector joint; and
      ii. a first base joint disposed distally from the first connector joint along the longitudinal axis and pivotally connecting the electric actuator to the base via the linear actuator joint;
   c. a fluid actuator, comprising:
      i. a second base joint disposed proximate the first base joint and pivotally connected to the base at the fluid actuator joint; and
      ii. a second joint disposed distally from the second base joint along the longitudinal axis; and
   d. a pivoting connector pivotably connected to the base at the base connector joint, the pivoting connector comprising:
      i. an output attachment point;
      ii. a first actuator joint pivotally connected to the electric actuator at the first connector joint; and
      iii. a second connector joint pivotally connected to the fluid actuator at the second joint.
2. The compensated actuator of claim 1, where the pivoting connector further comprises an output attachment point configured to be connected to an upper deck frame.
3. The compensated actuator of claim 1, further comprising a fluid supply tank operatively in fluid communication with the fluid actuator.

* * * * *